United States Patent
Guo et al.

(10) Patent No.: US 10,005,469 B2
(45) Date of Patent: Jun. 26, 2018

(54) RESPONSE AMPLITUDE MODIFICATION FOR HYBRID ELECTRIC VEHICLE MISFIRE DETECTIONS

(71) Applicants: Yichao Guo, Rochester Hills, MI (US); Robert Stack, Grand Blanc, MI (US); Gang Wu, Troy, MI (US); Marcio Quiles, Lake Orion, MI (US)

(72) Inventors: Yichao Guo, Rochester Hills, MI (US); Robert Stack, Grand Blanc, MI (US); Gang Wu, Troy, MI (US); Marcio Quiles, Lake Orion, MI (US)

(73) Assignee: FCA US LLC, Auburn Hills, MI (US)

(*) Notice: Subject to any disclaimer, the term of this patent is extended or adjusted under 35 U.S.C. 154(b) by 44 days.

(21) Appl. No.: 15/176,379

(22) Filed: Jun. 8, 2016

(65) Prior Publication Data

US 2017/0355376 A1    Dec. 14, 2017

(51) Int. Cl.
*B60W 30/20* (2006.01)
*B60W 10/10* (2012.01)
*B60W 20/50* (2016.01)
*F02D 41/14* (2006.01)

(52) U.S. Cl.
CPC ........... *B60W 30/20* (2013.01); *B60W 10/10* (2013.01); *B60W 20/50* (2013.01); *F02D 41/1498* (2013.01); *B60W 2030/206* (2013.01); *B60W 2510/06* (2013.01); *Y10S 903/917* (2013.01)

(58) Field of Classification Search
CPC ...... B60W 30/20; B60W 10/10; B60W 20/50; F02D 41/1495
USPC .......................................................... 701/22
See application file for complete search history.

(56) References Cited

U.S. PATENT DOCUMENTS

| | | | |
|---|---|---|---|
| 5,440,922 A | 8/1995 | Ichikawa | |
| 5,744,722 A | 4/1998 | Wu et al. | |
| 6,112,149 A | 8/2000 | Varady et al. | |
| 7,467,033 B2 | 12/2008 | Miller et al. | |
| 7,543,483 B2 | 6/2009 | Akimoto et al. | |

(Continued)

FOREIGN PATENT DOCUMENTS

| | | |
|---|---|---|
| DE | 102009047116 A1 | 5/2011 |
| EP | 2017453 A1 | 9/2009 |
| WO | 2013068356 A1 | 5/2013 |

OTHER PUBLICATIONS

International Search Report and Written Opinion dated Aug. 14, 2017 for International Application No. PCT/US2017/034129, International Filing Date May 24, 2017.

*Primary Examiner* — Yazan A Soofi
(74) *Attorney, Agent, or Firm* — Ralph E. Smith

(57) ABSTRACT

Misfire detection techniques for a hybrid electric vehicle (HEV) including an internal combustion engine and an electric motor involve utilizing a crankshaft speed sensor configured to generate a crankshaft speed signal indicative of a rotational speed of a crankshaft of the engine that is coupled to the electric motor via a flywheel. The techniques also utilize a controller configured to control the electric motor to provide a vibrational response to dampen disturbances to the crankshaft, receive the crankshaft speed signal, selectively modify the crankshaft speed signal to obtain a modified crankshaft speed signal, and detect a misfire of the engine based on the modified crankshaft speed signal and a set of thresholds including at least one of a negative misfire threshold and a positive vibrational response threshold.

20 Claims, 6 Drawing Sheets

(56) References Cited

U.S. PATENT DOCUMENTS

| | | | |
|---|---|---|---|
| 7,571,640 B2* | 8/2009 | Andrews | G01M 15/11 |
| | | | 73/114.07 |
| 7,937,992 B2 | 5/2011 | Akimoto et al. | |
| 2009/0271099 A1* | 10/2009 | Jones | F02D 41/0225 |
| | | | 701/115 |
| 2010/0114460 A1* | 5/2010 | Akimoto | B60K 6/24 |
| | | | 701/111 |
| 2016/0169141 A1* | 6/2016 | Flynn | F02D 41/008 |
| | | | 701/102 |

* cited by examiner

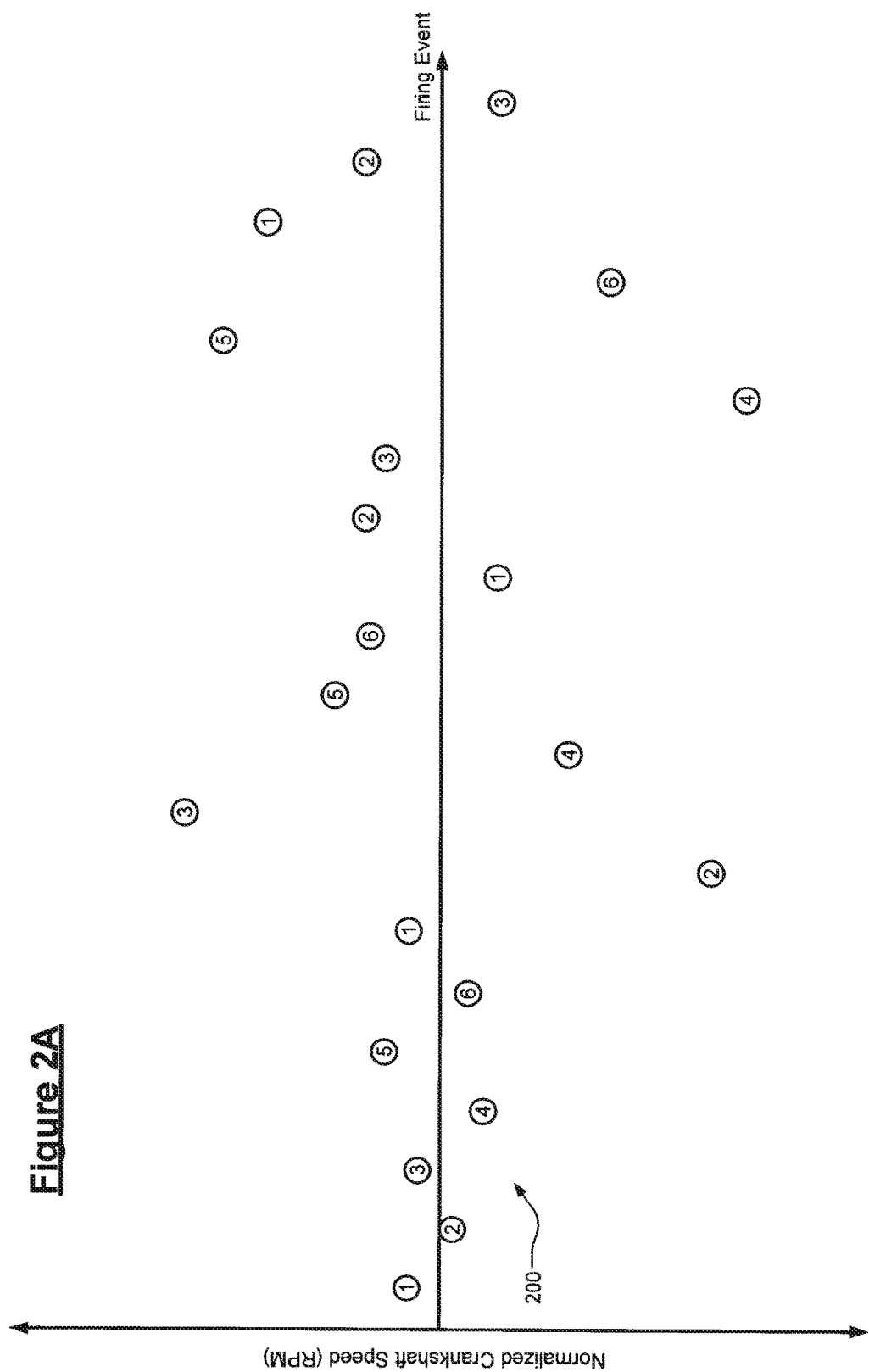

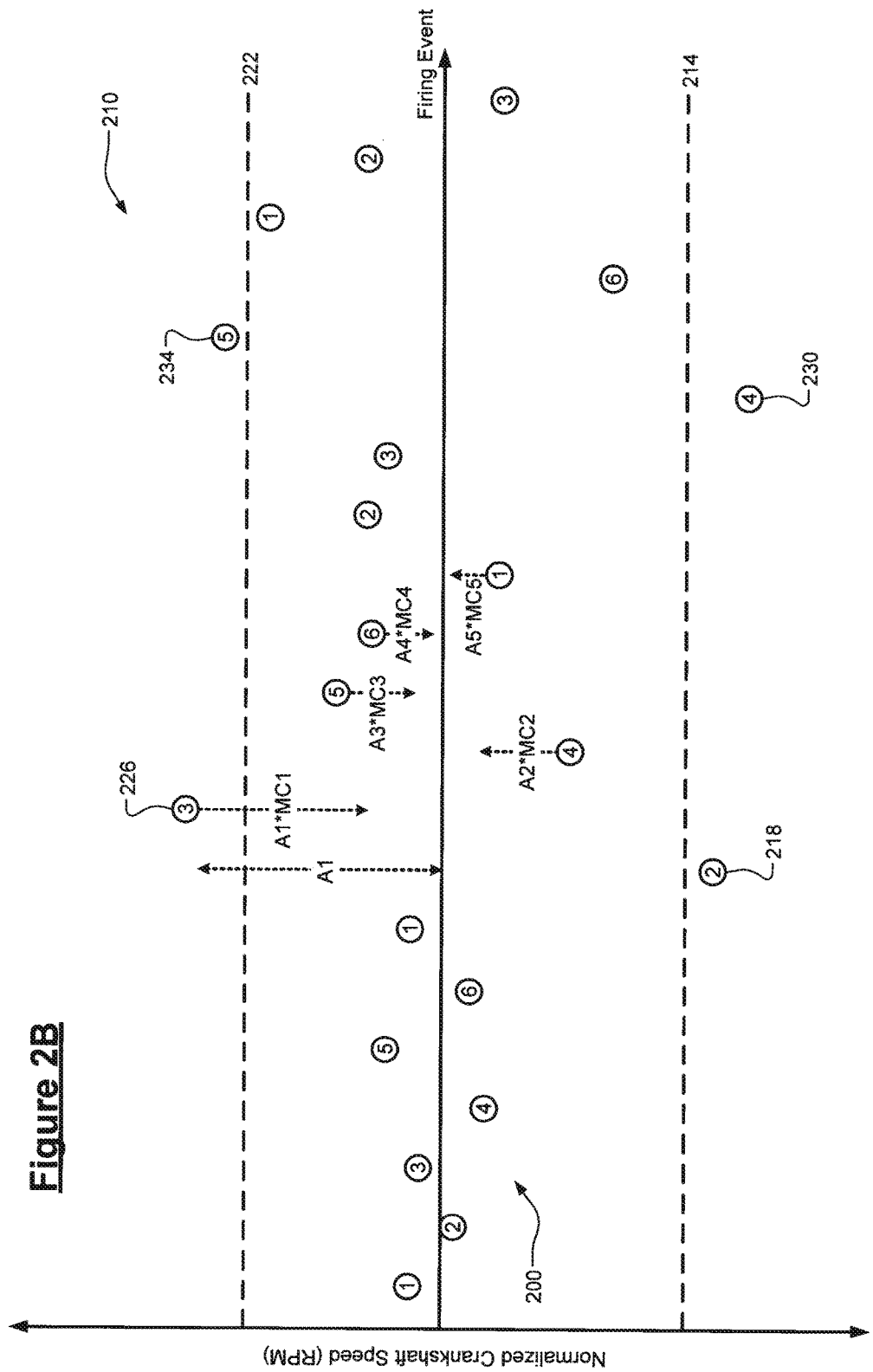

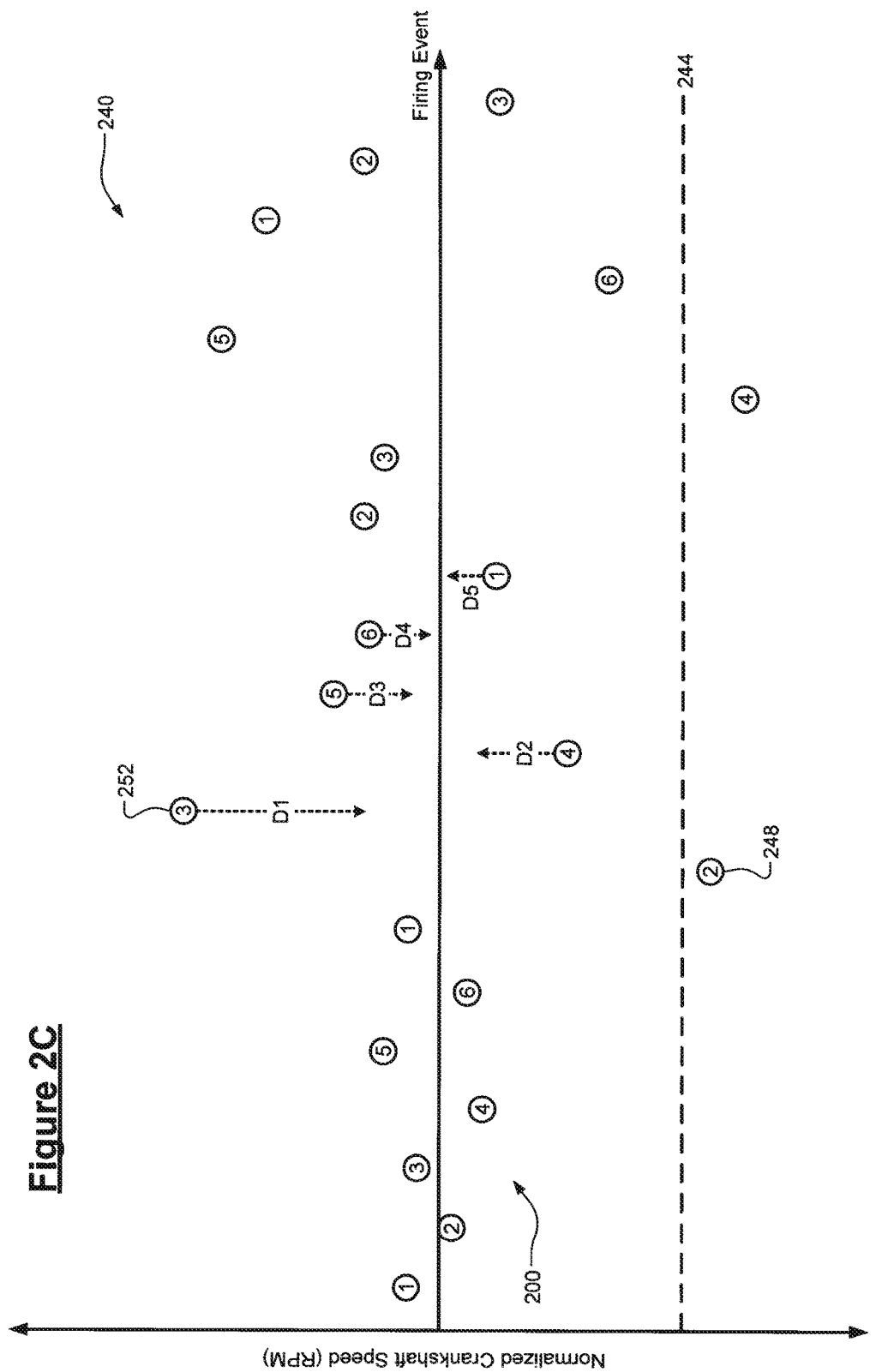

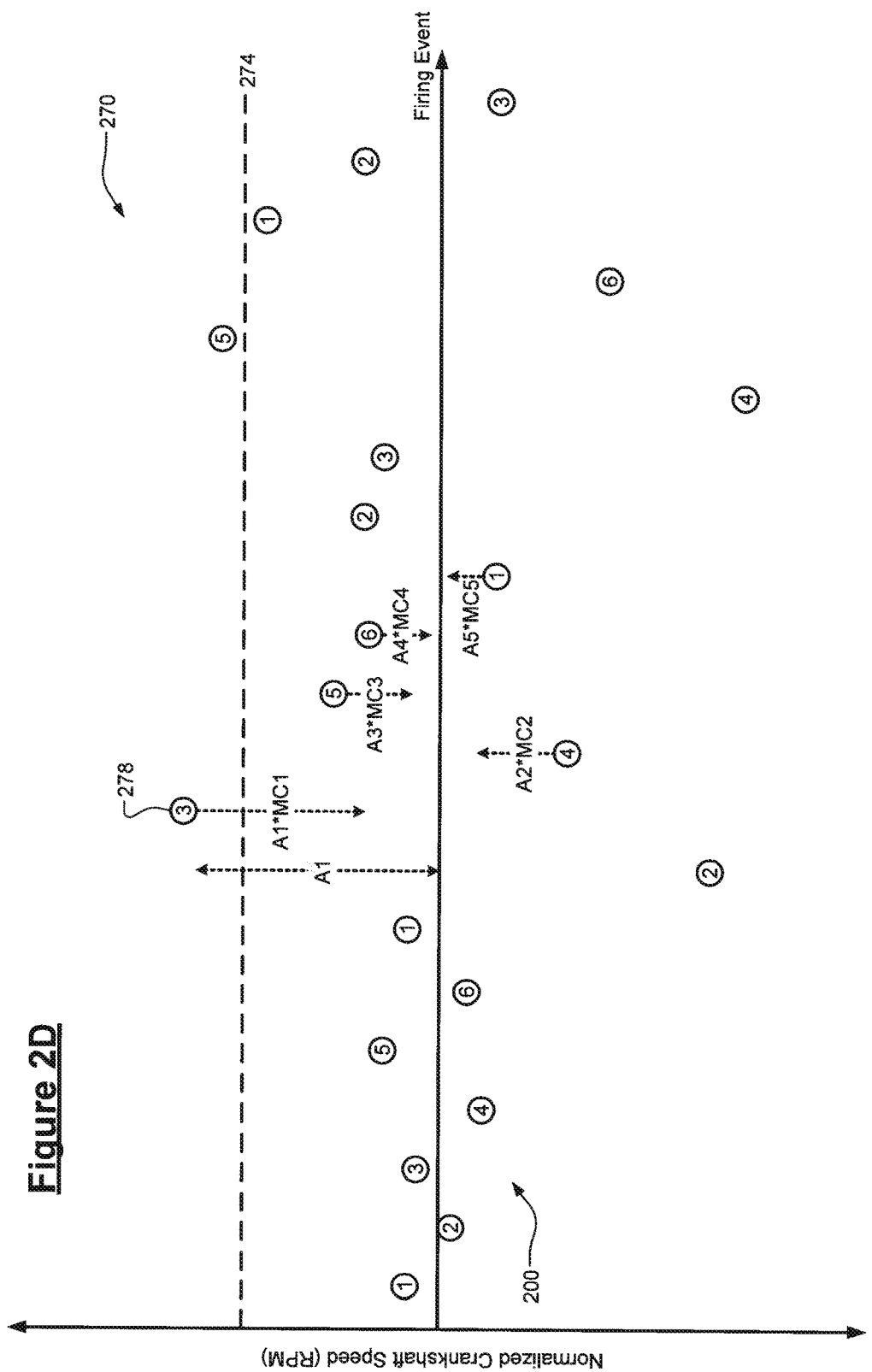

RESPONSE AMPLITUDE MODIFICATION FOR HYBRID ELECTRIC VEHICLE MISFIRE DETECTIONS

FIELD

The present application generally relates to engine misfire detection and, more particularly, to response amplitude modification techniques for hybrid electric vehicle (HEV) misfire detections.

BACKGROUND

Some hybrid electric vehicles (HEVs) include both an electric motor and an internal combustion engine. The electric motor is typically coupled to a crankshaft of the engine via a flywheel, such as a dual-mass flywheel. The engine combusts an air/fuel mixture to generate drive torque that is transferred to the electric motor. In some implementations, the electric motor is further configured to be driven (e.g., by a battery system) to act as a dampener to vibrational disturbances to the crankshaft. Misfires of the engine are typically detected based on a crankshaft speed signal.

These sources of vibrational responses (the dual-mass flywheel, the electric motor dampening, an overall soft stiffness design of connections between the engine and other components, etc.), however, often cause a smaller separation or distinction in the crankshaft speed signal between normal and misfire events. Thus, engine misfire detection could be negatively affected with such an arrangement. Accordingly, while such misfire detection systems work for their intended purpose, there remains a need for improvement in the relevant art.

SUMMARY

According to a first aspect of the invention, a misfire detection system for a hybrid electric vehicle (HEV) including an internal combustion engine and an electric motor is presented. In one exemplary implementation, the system includes a crankshaft speed sensor configured to generate a crankshaft speed signal indicative of a rotational speed of a crankshaft of the engine, the crankshaft being coupled to the electric motor via a flywheel; and a controller configured to: control the electric motor to provide a vibrational response to dampen disturbances to the crankshaft; receive the crankshaft speed signal; modifying an amplitude of the crankshaft speed signal to obtain a modified crankshaft speed signal; and detect a misfire of the engine based on the modified crankshaft speed signal and a set of thresholds, wherein the set of thresholds includes at least one of a negative misfire threshold and a positive vibrational response threshold.

According to a second aspect of the invention, a misfire detection method for a hybrid electric vehicle (HEV) including an internal combustion engine and an electric motor is presented. In one exemplary implementation, the method includes controlling, by a controller of the HEV, the electric motor to provide a vibrational response to dampen disturbances to a crankshaft of the engine, the crankshaft being coupled to the electric motor via a flywheel; receiving, by the controller and from a crankshaft sensor of the HEV, a crankshaft speed signal indicative of a rotational speed of the crankshaft; selectively modifying, by the controller, an amplitude of the crankshaft speed signal to obtain a modified crankshaft speed signal; and detecting, by the controller, a misfire of the engine based on the modified crankshaft speed signal and a set of thresholds, wherein the set of thresholds includes at least one of a negative misfire threshold and a positive vibrational response threshold.

In some implementations, the controller is further configured to selectively modify, as a product with a vibrational decay coefficient, an amplitude of each of one or more peaks of the crankshaft speed signal corresponding to firing events of the engine. In some implementations, the controller is further configured to detect the misfire of the engine by monitoring N consecutive firing events of the engine, wherein N is an integer greater than one and is calibrated for a particular engine load and engine speed. In some implementations, the flywheel is a dual-mass flywheel that provides another vibrational response to dampen the disturbances to the crankshaft.

In some implementations, the controller is further configured to: detect a first misfire of the engine when (i) a first negative peak of the crankshaft speed signal corresponding to a first firing event of the N consecutive firing events is less than (ii) the negative misfire threshold; and after detecting the first misfire, detect a potential second misfire of the engine when (i) a subsequent second peak of the crankshaft speed signal corresponding to a second firing event of the N consecutive firing events is less than (ii) the vibrational response threshold. In some implementations, the controller is further configured to: after detecting the potential second misfire of the engine, detect the second misfire of the engine when (i) the second peak of the crankshaft speed signal is less than (ii) a predetermined misfire threshold; and when no second misfire is detected, apply amplitude adjustments to subsequent peaks of the crankshaft speed signal corresponding to a remainder of the N consecutive firing events. In some implementations, when the second peak does exceed the vibrational response threshold, the controller is configured to modify the crankshaft speed signal by reducing the second peak as a product with a vibrational decay coefficient to obtain the modified crankshaft speed signal that includes a modified second peak; and the controller is further configured to detect the second misfire based on a magnitude of the modified second peak.

In some implementations, the controller is configured to detect a first misfire of the engine when (i) a magnitude of a first peak of the crankshaft speed signal corresponding to a first firing event of the N consecutive firing events exceeds (ii) the misfire threshold; after detecting the first misfire, the controller is configured to modify the crankshaft speed signal by applying amplitude adjustments to (N−1) next peaks of the crankshaft speed signal corresponding to a remainder of the N consecutive firing events, wherein each amplitude adjustment is calculated as a minimum of an original amplitude and an absolute value of the difference between a product of corresponding base and coefficient values retrieved from separate look-up tables, and wherein the base coefficient values are determined by modeling the vibrational response based on engine speed and engine load; and the controller is configured to detect one or more additional misfires of the engine based on magnitudes of the (N−1) modified peaks. In some implementations, the controller is further configured to continuously update at least one of amplitude, damping, and frequency of the modeled vibrational response during a deceleration fuel cutoff (DFCO) event.

In some implementations, the controller is configured to detect a vibrational response when (i) a magnitude of a first peak of the crankshaft speed signal corresponding to a first firing event of the N consecutive firing events exceeds (ii) the vibrational response threshold; after detecting the vibrational response, the controller is configured to modify the crankshaft speed signal by modifying the first peak and (N−1) next peaks of the crankshaft speed signal each as a product with a corresponding vibrational decay coefficient to obtain N modified peaks of the modified crankshaft speed signal, wherein the (N−1) next peaks correspond to a remainder of the N consecutive firing events; and the controller is configured to detect one or more misfires of the engine based on magnitudes of the N modified peaks.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIGS. 2A-2D are graphs illustrating example normalized crankshaft speed data and example misfire detection techniques according to the principles of the present disclosure.

DETAILED DESCRIPTION

As previously mentioned, some hybrid electric vehicles (HEVs) include sources that negatively affect the performance of conventional engine misfire detection. These sources include, but are not limited to, (i) a dual-mass flywheel coupling a crankshaft of an engine to an electric motor, (ii) the electric motor operating as a dampener to fluctuations in a crankshaft speed signal, and (iii) an overall soft stiffness design of connections between the engine and other components. More particularly, each of these sources causes large vibrational responses that affect the crankshaft speed signal and thereby affect engine misfire detection. False positives and false fails for engine misfire detection could potentially increase emissions and/or warranty costs. Accordingly, techniques are presented for response amplitude modification for HEV misfire detection.

Figure 1:
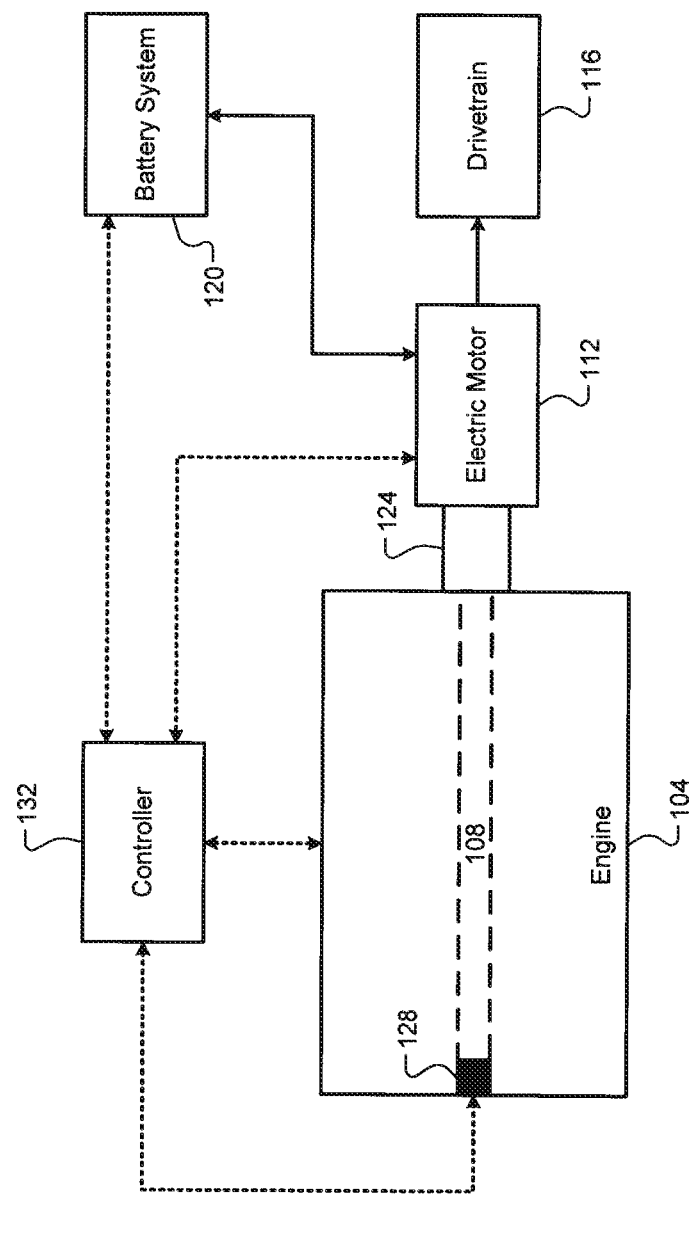
FIG. 1 is a diagram of an example hybrid electric vehicle (HEV) according to the principles of the present disclosure.

Referring now to FIG. 1, a diagram of an example HEV 100 is illustrated. One example of the HEV is a plug-in HEV (PHEV), but it will be appreciated that the HEV 100 could be any suitable HEV (e.g., a mild hybrid vehicle) that comprises one or more above-mentioned sources that dampen crankshaft disturbances and thereby negatively affect engine misfire detection. The HEV 100 includes an internal combustion engine 104 configured to combust an air/fuel mixture to generate drive torque at a crankshaft 108. The HEV 100 also includes an electric motor 112 configured to generate drive torque for a drivetrain 116 of the HEV 100. In some implementations, the HEV 100 also includes a battery system 120 configured to provide an electrical current to drive the electric motor 112. While the techniques of the present disclosure are described with respect to HEVs, it will be appreciated that these techniques could be implemented in any vehicle comprising an engine and an electric motor configured to dampen crankshaft disturbances.

The electric motor 112 is coupled to the crankshaft 108 via a flywheel 124. In one exemplary implementation, the flywheel 124 is a dual-mass flywheel. The dual-mass flywheel configuration provides for vibration dampening or reduction by accumulating stored energy into two flywheel half-masses over a period of time while simultaneously dampening at a comparable rate via a series of springs, which is subsequently releasable at a much higher rate. The flywheel 124 is configured to transfer drive torque from the crankshaft 108 to the electric motor 112, and vice-versa. A crankshaft sensor 128 is configured to measure a rotational position of or a rotational speed of the crankshaft 108. In one exemplary implementation, the crankshaft sensor 128 is a Hall effect sensor configured to measure a rotational position of a toothed wheel coupled to the crankshaft 108.

A controller 132 is configured to control operation of the HEV 100, including controlling the engine 104 and/or the electric motor 112 to produce a desired drive torque at the drivetrain 116. In response to a disturbance to the crankshaft 108, the controller 132 is also configured to control the electric motor 112 (e.g., via an electrical current supplied by the battery system 120) to provide torque to the crankshaft 108. This torque generated by the electrical motor 112 could be in either rotational direction, depending on the desired dampening. This torque is also referred to as a vibrational response provided by the electric motor 112 to the crankshaft. The controller 132 is also configured to utilize the crankshaft speed signal to perform one or more engine misfire detection techniques.

In one exemplary implementation, the crankshaft sensor 128 is a crankshaft position sensor that measures a rotational position (e.g., a crankshaft angle). These measurements could be discrete samples at a median sampling rate. The controller 132 could then calculate crankshaft speed (e.g., in revolutions per minute, or RPM) based on the sampled data. In one exemplary implementation, the calculated crankshaft speeds are normalized such that normal firing events have a normalized crankshaft speed of approximately zero, but misfire events have a normalized crankshaft speed of approximately negative 0.2 or less. By normalizing the crankshaft speed as discussed, the controller 132 is able to better discern between normal firing events and misfire events. In such implementations, the normalized crankshaft speed represents the crankshaft speed signal, prior to any amplitude modification.

Referring now to FIGS. 2A-2D, example normalized crankshaft speed data 200 is illustrated. This normalized crankshaft speed data 200 is used to describe each of three different misfire detection techniques in FIGS. 2B-2D. As shown, the normalized crankshaft speed samples correspond to particular firing events, which are illustrated as cylinder numbers 1 to 6. While a six cylinder configuration for the engine 104 is utilized herein, it will be appreciated that the engine 104 could have any other suitable cylinder configurations. For the earlier or initial firing events, the normalized crankshaft speed is approximately zero, which is indicative or normal firing events (i.e., not misfires). After the second samples firing event for the first cylinder (1), however, disturbances begin to occur.

Referring now to FIG. 2B, a first misfire detection technique 210 is illustrated using the normalized crankshaft speed data 200. As previously mentioned, normal firing events should correspond to a normalized crankshaft speed signal of approximately zero. A misfire event, on the other hand, should trigger a large negative amplitude in the crankshaft speed. This initial large negative amplitude should be followed by subsequent vibrational responses, which typically last approximately five firing events. The specific number of subsequent firing events depends on engine load and/or engine speed. These vibrational responses are caused by the overall mechanical system being underdamped. Thus, the amplitudes of the subsequent vibrational responses decay exponentially, and thus dissipate in approximately two vibrational periods.

In FIG. 2B, a misfire threshold 214 is utilized to detect a first misfire event 218. As mentioned above, subsequent vibrational responses are expected following the misfire event 218. Thus, a vibrational response threshold 222 is utilized to verify the expected vibrational response. As shown, the normalized crankshaft speed signal exceeds the vibrational response threshold 222, and thus a next firing event 226 is as expected. If the normalized crankshaft speed signal for the next firing event 226 does not exceed the vibrational response threshold 222, however, then another misfire event could have occurred. For example, the magnitude of the next firing event 226 could be negative and could exceed the misfire threshold 214 or another lesser misfire threshold.

After verifying the expected vibrational response for the second firing event 226, the expected vibrational response is verified for a remainder of a number of firing events. As previously mentioned, this is typically about five firing events. The actual number, however, depends upon engine load and/or engine speed. For example, at higher loads/speeds, the number could be larger. A look-up table is used to determine the number of firing events to monitor. Due to the decay behavior of the system, decay coefficients (less than one) are utilized. More particularly, amplitudes of the next firing event 226 ("A1") and subsequent firing events ("A2" to "A5") are multiplied by coefficients for the subsequent five firing events (hereinafter, coefficients "MC1" to "MC5"). These coefficients are determined based on engine speed/load calibration data (e.g., dynamometer data) and could be stored in a look-up table at the controller 132.

By normalizing the magnitudes of the vibrational responses after the misfire event 218, the data is concentrated closer to zero (similar to normal firing events) and thus provides a better separation between normal firing and misfire events. This process is repeatable for the additional normalized crankshaft speed data 200 as well. As shown, another misfire event 230 is detected and a next firing event 234 is verified as having an expected vibrational response. The same or similar coefficients MC1-MC5 could then be applied to following firing events to normalize the data for better misfire detection (i.e., better separation between normal and misfire events, and thus fewer false misfire detections and/or false passes).

This first misfire detection technique 210 greatly simplifies calibrations because a single threshold 222 is utilized to detect excessive vibrational response. This technique 210 is also enabled on when needed, i.e., triggered when a misfire event 218 or 230 is detected. The length of the amplitude modification process is then based on engine speed/load. This is also a passive response removal method, meaning that adaptive learning is not required. Vehicle life cycle and vehicle-to-vehicle variation both have no impact on this technique 210 because vibrational response is detected regardless of the response frequency. Also, unlike finite impulse response (FIR) and infinite impulse response (IIR) filters, this modification process is without delay or phase shift, which further simplifies synchronization with different input signals.

Referring now to FIG. 2C, a second misfire detection technique 240 is illustrated using the normalized crankshaft speed data 200. Similar to above, a misfire threshold 244 is utilized to detect a misfire event 248. Unlike the first technique 210, however, there is no vibrational response threshold utilized for the next firing event 252 during execution of the second misfire detection technique 240. Instead, amplitude adjustments are applied to the next five firing events (hereinafter, deltas "D1" to "D5"). As previously discussed, the number of firing events could change based on engine speed/load. In one exemplary implementation, each delta is a product of a corresponding base value (MB) and a corresponding coefficient value (MC). These values are stored at the controller 132, such as in a look-up table based on engine speed/load.

Due to the decay behavior of the response, each amplitude adjustment should satisfy the following condition:

$$|A(n+i)_{new}|=\min(|A(n+i)_{original}|,|A(n+i)_{original}-MB(n+i)*MC(n+i)|),$$

where n is the number of firing events being monitored, i is an index (e.g., from 1 to 5), $A_{new}$ is a modified amplitude, and $A_{original}$ is the pre-modified amplitude. As mentioned above, the MB and MC values are predetermined and stored in a look-up table at the controller 132. In one exemplary implementation, the MB values are determined by modeling the vibrational response (amplitude, damping, and frequency) and are continuously updated by monitoring the vibrational response at specific conditions, such as deceleration fuel cut off (DFCO) (e.g., non-invasive periods). During application of the amplitude adjustments, if any of the actual amplitudes are well below (i.e., more than a threshold) from the expected values, a new misfire is detected.

This second technique 240 represents a hybrid frequency/time domain design function, which relies on a simple accumulator that estimates the time starting from the most recent misfire event in order to connect the time domain based vibrational response model (with fixed vibrational characteristics, such as frequency and amplitudes) to the frequency/cylinder firing events based response modification. Such a process allows the look-up table to be effective not only across a wide range of engine speeds, but also in transient conditions where engine speed changes dramatically. This technique 240 also utilizes adaptive learning by combining mechanical system modeling with continuous updating, thereby eliminating vehicle-to-vehicle and vehicle life variances. Similar to the first technique 210, no delay or phase shift is required.

Referring now to FIG. 2D, a third misfire detection technique 270 is illustrated using the normalized crankshaft speed data 200. This technique 270 does not rely upon the initial detection of a misfire event. Instead, this technique 270 initially looks for a large positive amplitude for a firing event, which is indicative of a vibrational response following a misfire event. Specifically, a vibrational response threshold 270 is utilized to detect a firing event 278 having a large positive amplitude A1. The technique 270 then involves applying amplitude adjustments for the next calibratable number of firing events (e.g., five), which includes firing event 278. As shown, the amplitudes A1 to A5 are multiplied by decay coefficients MC1-MC5, respectively, similar to the first technique 210. Similar to the second technique 240, the adjusted amplitudes $A_{new}$ should satisfy the following condition, where A(1)=A1, MC(1)=MC1, and so on and so forth:

$$|A(n+i)_{new}|=|A(n+i)_{original}|*MC(n+i),$$

Again, this technique 270 provides for greatly simplified calibrations because a single threshold 274 is utilized to detect excessive vibrational response and a single look-up table is utilized to determine the decay coefficients. Because this technique 270 does not rely upon detection of misfire events, the logic is enabled to avoid future normal firings being mistakenly reported as an actual misfire whenever the detection logic misses a misfire event. Therefore, interference with techniques 210 or 240 is preventable (e.g., by selecting a single bit). That is, techniques 210 and 270 could be concurrently implemented, or techniques 240 and 270 could be concurrently implemented. Similar to the first technique 210, this technique 270 is a passive response removal method that does not require adaptive learning. Vehicle life and vehicle-to-vehicle variations also have no impact on this technique 270.

Figure 3:
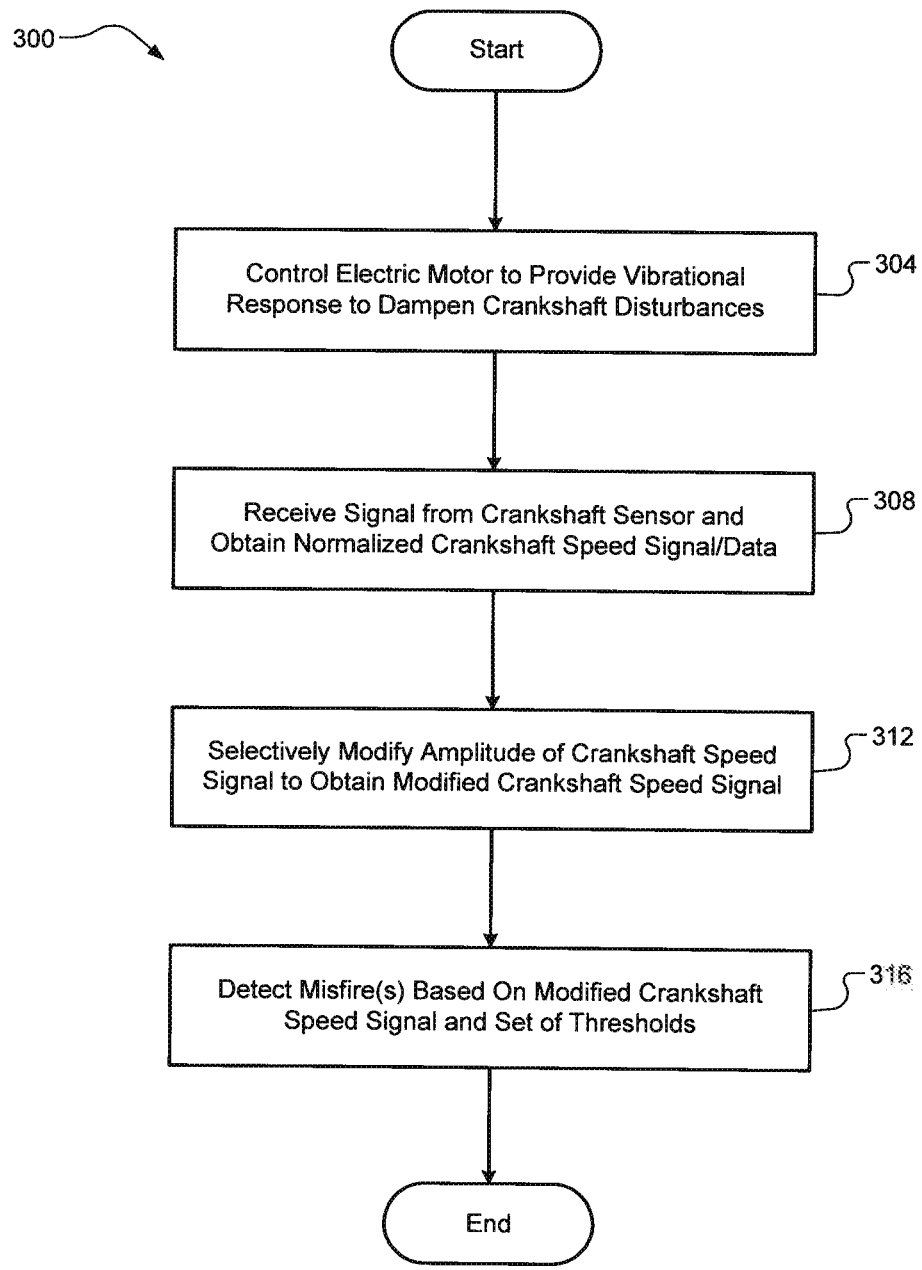
FIG. 3 is a flow diagram of an example method of response amplitude modification for HEV misfire detections according to the principles of the present disclosure.

Referring now to FIG. 3, a flow diagram of an example method 300 for response amplitude modification for HEV misfire detection is illustrated. At 304, the controller 132 controls the electric motor 112 to provide a vibrational response to dampen disturbances to the crankshaft 108. At 308, the controller 132 receives, from the crankshaft sensor 128, a crankshaft speed signal indicative of a rotational speed of the crankshaft 108. As previously discussed herein, the controller 132 could receive a position signal from the crankshaft sensor 128, which could be processed to obtain normalized crankshaft speed data that forms the crankshaft speed signal. At 312, the controller 132 selectively modifies an amplitude of the crankshaft speed signal to obtain a modified crankshaft speed signal. At 316, the controller 132 detects a misfire of the engine 104 based on the modified crankshaft speed signal and a set of thresholds. As illustrated in FIGS. 2B-2D and as discussed in detail above, the detection of the misfire is performed via one of or a combination of the three misfire detection techniques 210, 240, 270 of the present disclosure. The method 300 then ends or returns to 304 for one or more additional cycles.

As previously discussed, it will be appreciated that the term "controller" as used herein refers to any suitable control unit configured to perform at least a portion of the techniques of the present disclosure. Examples include an ASIC, one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A misfire detection system for a hybrid electric vehicle (HEV) including an internal combustion engine and an electric motor, the system comprising:
   a crankshaft speed sensor configured to generate a crankshaft speed signal indicative of a rotational speed of a crankshaft of the engine, the crankshaft being coupled to the electric motor via a flywheel; and
   a controller configured to:
      control the electric motor to provide a vibrational response to dampen disturbances to the crankshaft;
      receive the crankshaft speed signal;
      modify an amplitude of the crankshaft speed signal to obtain a modified crankshaft speed signal; and
      detect a misfire of the engine based on the modified crankshaft speed signal and a set of thresholds, wherein the set of thresholds includes at least one of a negative misfire threshold and a positive vibrational response threshold.

2. The system of claim 1, wherein the controller is further configured to selectively modify, as a product with a vibrational decay coefficient, an amplitude of each of one or more peaks of the crankshaft speed signal corresponding to firing events of the engine.

3. The system of claim 1, wherein the controller is further configured to detect the misfire of the engine by monitoring N consecutive firing events of the engine, wherein N is an integer greater than one and is calibrated for a particular engine load and engine speed.

4. The system of claim 3, wherein the controller is further configured to:
   detect a first misfire of the engine when (i) a first negative peak of the crankshaft speed signal corresponding to a first firing event of the N consecutive firing events is less than (ii) the negative misfire threshold; and
   after detecting the first misfire, detect a potential second misfire of the engine when (i) a subsequent second peak of the crankshaft speed signal corresponding to a second firing event of the N consecutive firing events is less than (ii) the positive vibrational response threshold.

5. The system of claim 4, wherein the controller is further configured to:
   after detecting the potential second misfire of the engine, detect the second misfire of the engine when (i) the second peak of the crankshaft speed signal is less than (ii) a predetermined negative misfire threshold; and
   when no second misfire is detected, apply amplitude adjustments to subsequent peaks of the crankshaft speed signal corresponding to a remainder of the N consecutive firing events.

6. The system of claim 4, wherein:
   when the second peak does exceed the vibrational response threshold, the controller is configured to modify the crankshaft speed signal by reducing the second peak as a product with a vibrational decay coefficient to obtain the modified crankshaft speed signal that includes a modified second peak; and
   the controller is further configured to detect the second misfire based on a magnitude of the modified second peak.

7. The system of claim 3, wherein:
   the controller is configured to detect a first misfire of the engine when (i) a magnitude of a first peak of the crankshaft speed signal corresponding to a first firing event of the N consecutive firing events exceeds (ii) the misfire threshold;
   after detecting the first misfire, the controller is configured to modify the crankshaft speed signal by applying amplitude adjustments to (N−1) next peaks of the crankshaft speed signal corresponding to a remainder of the N consecutive firing events, wherein each amplitude adjustment is calculated as a minimum of an original amplitude and an absolute value of the difference between the original amplitude and a product of corresponding base and coefficient values retrieved from separate look-up tables, and wherein the base coefficient values are determined by modeling the vibrational response based on engine speed and engine load; and the controller is configured to detect one or more additional misfires of the engine based on magnitudes of the (N−1) modified peaks.

8. The system of claim 7, wherein the controller is further configured to continuously update at least one of amplitude, damping, and frequency of the modeled vibrational response during a deceleration fuel cutoff (DFCO) event.

9. The system of claim 3, wherein:

the controller is configured to detect a vibrational response when (i) a magnitude of a first peak of the crankshaft speed signal corresponding to a first firing event of the N consecutive firing events exceeds (ii) the vibrational response threshold;

after detecting the vibrational response, the controller is configured to modify the crankshaft speed signal by modifying the first peak and (N−1) next peaks of the crankshaft speed signal each as a product with a corresponding vibrational decay coefficient to obtain N modified peaks of the modified crankshaft speed signal, wherein the (N−1) next peaks correspond to a remainder of the N consecutive firing events; and the controller is configured to detect one or more misfires of the engine based on magnitudes of the N modified peaks.

10. The system of claim 1, wherein the flywheel is a dual-mass flywheel that provides another vibrational response to dampen the disturbances to the crankshaft.

11. A misfire detection method for a hybrid electric vehicle (HEV) comprising an internal combustion engine and an electric motor, the method comprising:

controlling, by a controller of the HEV, the electric motor to provide a vibrational response to dampen disturbances to a crankshaft of the engine, the crankshaft being coupled to the electric motor via a flywheel;

receiving, by the controller and from a crankshaft sensor of the HEV, a crankshaft speed signal indicative of a rotational speed of the crankshaft;

selectively modifying, by the controller, an amplitude of the crankshaft speed signal to obtain a modified crankshaft speed signal; and detecting, by the controller, a misfire of the engine based on the modified crankshaft speed signal and a set of thresholds, wherein the set of thresholds includes at least one of a negative misfire threshold and a positive vibrational response threshold.

12. The method of claim 11, further comprising selectively modifying, by the controller and as a product with a vibrational decay coefficient, an amplitude of each of one or more peaks of the crankshaft speed signal corresponding to firing events of the engine.

13. The method of claim 11, further comprising detecting, by the controller, the misfire of the engine by monitoring N consecutive firing events of the engine, wherein N is an integer greater than one and is calibrated for a particular engine load and engine speed.

14. The method of claim 13, further comprising:

detecting, by the controller, a first misfire of the engine when (i) a first negative peak of the crankshaft speed signal corresponding to a first firing event of the N consecutive firing events is less than (ii) the negative misfire threshold; and after detecting the first misfire, detecting, by the controller, a potential second misfire of the engine when (i) a subsequent second peak of the crankshaft speed signal corresponding to a second firing event of the N consecutive firing events is less than (ii) the positive vibrational response threshold.

15. The method of claim 14, further comprising:

after detecting the potential second misfire of the engine, detecting, by the controller, the second misfire of the engine when (i) the second peak of the crankshaft speed signal is less than (ii) a predetermined misfire threshold; and when no second misfire is detected, applying, by the controller, amplitude adjustments to subsequent peaks of the crankshaft speed signal corresponding to a remainder of the N consecutive firing events.

16. The method of claim 14, further comprising:

when the second peak does exceed the vibrational response threshold, modifying, by the controller, the crankshaft speed signal by reducing the second peak as a product with a vibrational decay coefficient to obtain the modified crankshaft speed signal that includes a modified second peak; and detecting, by the controller, the second misfire based on a magnitude of the modified second peak.

17. The method of claim 13, further comprising:

detecting, by the controller, a first misfire of the engine when (i) a magnitude of a first peak of the crankshaft speed signal corresponding to a first firing event of the N consecutive firing events exceeds (ii) the misfire threshold;

after detecting the first misfire, modifying, by the controller, the crankshaft speed signal by modifying (N−1) next peaks of the crankshaft speed signal corresponding to a remainder of the N consecutive firing events, wherein each amplitude adjustment is calculated as a minimum of an original amplitude and an absolute value of the difference between the original amplitude and a product of corresponding base and coefficient values retrieved from separate look-up tables, and wherein the base coefficient values are determined by modeling the vibrational response based on engine speed and engine load; and detecting, by the controller, one or more additional misfires of the engine based on magnitudes of the (N−1) modified peaks.

18. The method of claim 17, further comprising continuously updating, by the controller, at least one of amplitude, damping, and frequency of the modeled vibrational response during a deceleration fuel cutoff (DFCO) event.

19. The method of claim 13, further comprising:

detecting, by the controller, a vibrational response when (i) a magnitude of a first peak of the crankshaft speed signal corresponding to a first firing event of the N consecutive firing events exceeds (ii) the vibrational response threshold;

after detecting the vibrational response, modifying, by the controller, the crankshaft speed signal by applying amplitude adjustments to the first peak and (N−1) next peaks of the crankshaft speed signal each as a product with a corresponding vibrational decay coefficient to obtain N modified peaks of the modified crankshaft speed signal, wherein the (N−1) next peaks correspond to a remainder of the N consecutive firing events; and detecting, by the controller, one or more misfires of the engine based on magnitudes of the N modified peaks.

20. The method of claim 11, wherein the flywheel is a dual-mass flywheel that provides another vibrational response to dampen the disturbances to the crankshaft.

* * * * *